(12) United States Patent
Ferraro et al.

(10) Patent No.: US 11,609,803 B2
(45) Date of Patent: Mar. 21, 2023

(54) MANAGING EVENT DELIVERY IN A SERVERLESS COMPUTING ENVIRONMENT

(71) Applicant: Red Hat, Inc., Raleigh, NC (US)

(72) Inventors: Nicola Ferraro, Rome (IT); Andrea Cosentino, Rome (IT)

(73) Assignee: RED HAT, INC., Raleigh, NC (US)

( * ) Notice: Subject to any disclaimer, the term of this patent is extended or adjusted under 35 U.S.C. 154(b) by 1 day.

(21) Appl. No.: 17/022,528

(22) Filed: Sep. 16, 2020

(65) Prior Publication Data

US 2022/0083403 A1 Mar. 17, 2022

(51) Int. Cl.
*G06F 9/54* (2006.01)
*G06F 21/60* (2013.01)
*G06F 9/50* (2006.01)
*G06F 9/48* (2006.01)

(52) U.S. Cl.
CPC ............ *G06F 9/542* (2013.01); *G06F 9/4881* (2013.01); *G06F 9/5083* (2013.01); *G06F 9/546* (2013.01); *G06F 21/602* (2013.01)

(58) Field of Classification Search
CPC ........ G06F 9/542; G06F 9/546; G06F 9/5083; G06F 9/4881; G06F 21/602
See application file for complete search history.

(56) References Cited

U.S. PATENT DOCUMENTS

| | | | |
|---|---|---|---|
| 8,769,134 B2 | 7/2014 | Calder et al. | |
| 10,361,985 B1* | 7/2019 | Shveykin | ............ H04L 67/2842 |
| 10,382,380 B1* | 8/2019 | Suzani | ..................... H04L 51/30 |
| 10,454,795 B1 | 10/2019 | Jonsson et al. | |
| 10,565,034 B2 | 2/2020 | Zhang et al. | |
| 2007/0058541 A1* | 3/2007 | Pike | ......................... H04L 49/45 370/230 |
| 2013/0042001 A1* | 2/2013 | Gould | ..................... G06F 9/542 709/224 |
| 2015/0381709 A1* | 12/2015 | Word | ..................... H04L 49/90 709/203 |
| 2017/0192693 A1* | 7/2017 | Gupta | ..................... G06F 3/067 |
| 2017/0214762 A1* | 7/2017 | Swain | ................. H04L 67/2842 |

(Continued)

OTHER PUBLICATIONS

"Knative Brings Event-Driven and Serverless Computing to Kubernetes," Janakiram MSV, Nov. 1, 2019, https://thenewstack.io/knative-brings-event-driven-and-serverless-computing-to-kubernetes/.

(Continued)

*Primary Examiner* — Charles E Anya
(74) *Attorney, Agent, or Firm* — Kilpatrick Townsend & Stockton LLP (57) ABSTRACT

Event delivery can be managed in a serverless computing environment. For example, an event broker can determine that each event message in a group of event messages from one or more event producers includes a particular key among a set of keys, and can determine a target event consumer that is to receive the group of event messages. Based on each event message in the group of event messages including the particular key, the event broker can add each event message to a dispatching queue in a sequential order in which the plurality of event messages were received. The event broker can then provide the group of event messages in the dispatching queue to the target event consumer in the sequential order in which the group of event messages are in the dispatching queue.

20 Claims, 5 Drawing Sheets

(56) References Cited

U.S. PATENT DOCUMENTS

| | | | | |
|---|---|---|---|---|
| 2017/0310628 | A1* | 10/2017 | Norwood | H04L 51/23 |
| 2018/0176070 | A1* | 6/2018 | Shafiee | G06F 9/5083 |
| 2019/0014171 | A1* | 1/2019 | Stein | G06F 9/542 |
| 2019/0361755 | A1* | 11/2019 | Cote | G06F 9/5061 |
| 2020/0034216 | A1* | 1/2020 | Kolodzieski | G06F 8/60 |
| 2020/0169616 | A1* | 5/2020 | Chen | H04L 41/5054 |
| 2020/0225982 | A1 | 7/2020 | Jung et al. | |

OTHER PUBLICATIONS

Guo, Y.C., "Knative Eventing 101: Exercises to enable Knative Services to Consume Events," IBM, Oct. 1, 2019, https://developer.ibm.com/technologies/containers/tutorials/knative-eventing-101-labs/.

Ibryam, B., "Kubernetes Workloads in the Serverless Era: Architecture, Platforms, and Trends," Principal Architect at Red Hat, Aug. 12, 2019, https://www.infoq.com/articles/kubernetes-workloads-serverless-era/.

Richardson, R. et al., "Enriching Event-Driven Architectures with AWS Event Fork Pipelines," Amazon Web Services, Inc., Mar. 25, 2019, https://aws.amazon.com/blogs/compute/enriching-event-driven-architectures-with-aws-event-fork-pipelines/.

"Amazon SQS FIFO (First-In-First-Out) queues," Amazon Web Services, Inc., 2020, https://docs.aws.amazon.com/AWSSimpleQueueService/latest/SQSDeveloperGuide/FIFO-queues.html.

\* cited by examiner

FIG. 5

MANAGING EVENT DELIVERY IN A SERVERLESS COMPUTING ENVIRONMENT

TECHNICAL FIELD

The present disclosure relates generally to event delivery in a serverless computing environment. More specifically, but not by way of limitation, this disclosure relates to managing event delivery in a serverless computing environment.

BACKGROUND

Serverless computing environments have recently grown in popularity. A serverless computing environment is a distributed computing environment (e.g., a cloud computing environment or a computing cluster) with serverless computing capabilities. Serverless computing allows a developer to execute code without having to consider how to provision the appropriate computing resources for the code. For example, a serverless computing environment can automatically provision the resources required to run the code and scale to meet demand, without burdening the developer with those details. Since this setup and scaling of resources is hidden and abstracted from the developer, the computing environment appears to be "serverless" to the developer, despite it actually including one or more physical or virtual servers.

Serverless computing environments can have event-driven architectures that use events to trigger and communicate between software services ("services"). Event-driven architectures generally have three key components: event producers, event brokers, and event consumers. An event producer is a service that transmits an event message indicating an event to the event broker. An event can be a change in state or an update, like an item being placed in a shopping cart on an e-commerce website. The event broker is a service that can filter and route event messages to the event consumers. The event consumers are services that react to the event messages. In a serverless computing environment, event consumers are dynamically scalable based on their load (e.g., the number of incoming event messages). For example, the number of instances of an event consumer can be dynamically scaled up as the load increases or scaled down as the load decreases. In some cases, the number of instances of an event consumer can be scaled all the way down to zero.

DETAILED DESCRIPTION

Event consumers of a serverless computing environment can be dynamically scaled based on their load. For example, an event consumer can allow a user to purchase an item via a website. If many users are attempting to purchase items via the website, the serverless computing environment may scale up the number of instances of the event consumer to handle the increased load and push the event messages in parallel to the instances. While this dynamic scaling and parallelism may allow for high throughput in terms of events processed per unit of time, there are several problems that can arise as a result, particularly because event consumers generally have no control over the event system and the order in which they receive event messages. For example, an event broker may deliver event messages out of order to the instances of the event consumer, resulting in conflicts between the instances and data inconsistencies. As another example, the event broker may deliver related event messages in parallel to two different instances of the event consumer, causing data contention in the data tier of the serverless computing environment. To help resolve this data contention problem, some serverless computing environments can employ locking strategies (e.g., pessimistic locking or opportunistic locking) in the data tier to help maintain data consistency. But locking strategies are slow and create bottlenecks that degrade performance.

Some examples of the present disclosure can overcome one or more of the abovementioned problems via an event broker that can manage how event messages are delivered to event consumers so as to preserve the order of the event messages. For example, the event broker can receive a group of event messages from one or more event producers. The event messages can all have the same key but may have differing payloads. A "key" is a unique identifier usable for designating related event messages. The event broker can store the event messages in a queue (e.g., a first-in-first-out buffer) that is specific to the particular key and a particular event consumer, in a sequential order in which the event messages were received by the event broker. The event broker can then transmit the event messages to the particular event consumer in the order in which the event messages are positioned in the queue. This can preserve the sequential order of the event messages, such that two distinct event messages A and B having the same key will be processed in by the event consumer in sequential order (e.g., A will be processed strictly before B), whereas two distinct event messages C and D having different keys from one another can be processed in any order by the event consumer. Preserving the order of the event messages in this way can prevent the conflicts and data-contention problems described above, for example regardless of how many instances of the particular event consumer are running in the serverless computing environment. As a result, the event broker can allow the event consumer to consume events at a high throughput and dynamically scale based on the load, while also maintaining control over events that need to be processed in a specific order or in isolation.

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

Figure 1:
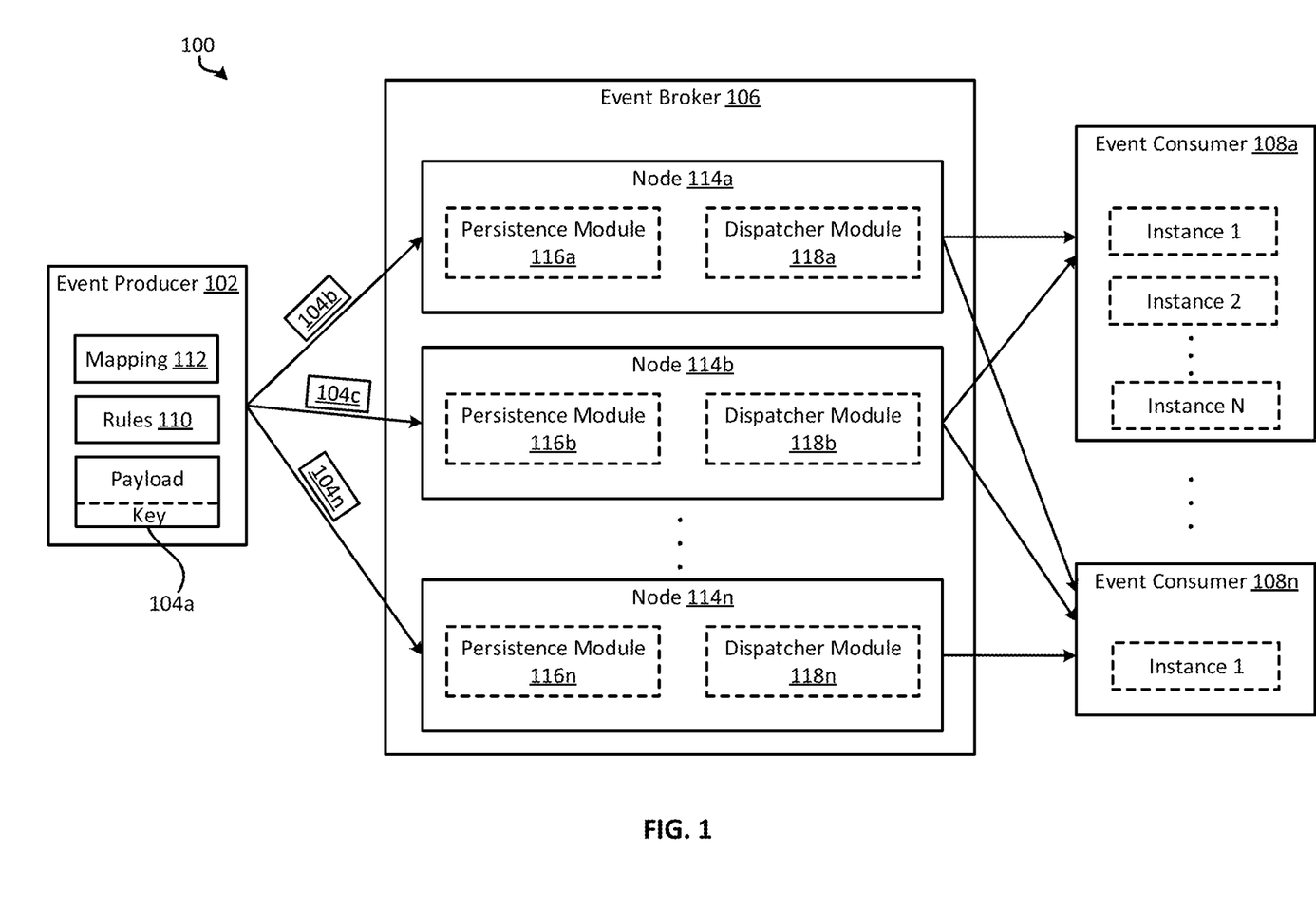
FIG. 1 is a block diagram of an example of a system for managing event delivery in a serverless computing environment according to some aspects of the present disclosure.

FIG. 1 is a block diagram of an example of a system for managing event delivery in a serverless computing environment 100 according to some aspects of the present disclosure. The serverless computing environment 100 can employ an event-driven architecture that includes an event producer 102 configured to produce event messages 104a-n, an event broker 106 configured to queue and forward the event messages 104a-n, and event consumers 108a-n configured to perform functions in response to the event messages 104a-n.

More specifically, the event producer 102 is a software service that can detect events and generate one or more event messages 104a-n based on the detected events. The serverless computing environment 100 can include any number of event producers for generating any number of event messages 104a-n, though only a single event producer 102 is shown in FIG. 1 for simplicity. Each event message can include a payload. The payload can include the content of the event message and may contain distinct sections, such as a body and headers. Some (but not necessarily all) event messages may also include a key. The key can be distinct from the payload and may be incorporated into the event message separately from the payload. The key can serve as a unique identifier that is usable to group and sequence event messages, as described in greater detail later on.

The event producer 102 can include rules 110 for determining if a key is to be assigned to an event message, as well as which key to assign to the event message. The rules 110 can include relationships between keys and event parameters. Examples of event parameters can include the type or content of the event, a user that triggered the event, an event consumer associated with the event, functionality that is to be invoked based on the event, or any combination of these. The event producer 102 can apply the rules 110 to an event's parameters for determining if a key, and which key, is to be to assigned to the event. If a key is to be assigned to an event, the event producer 102 can then incorporate the determined key into an event message 104a corresponding to the event. The event producer 102 can repeat this process for each event to determine keys for some or all of the event messages 104a-n.

In some examples, the event producer 102 can determine how to distribute the event messages 104a-n among nodes 114a-n (e.g., servers or other computing devices) of the event broker 106 based on the keys associated with the event messages 104a-n. Distributing the event messages 104a-n among the nodes 114a-n can serve to balance a load on the event broker 106. In particular, the event broker 106 may be formed from any number of nodes 114a-n, which can be dynamically scaled to meet demand. Each of the nodes 114a-n can be assigned to handle a set of event-message keys that is different from, and non-overlapping with, the sets of keys assigned to the other nodes 114a-n. For example, node 114a can be assigned to handle keys 1-3, node 114b can be assigned to handle keys 4-6, and node 114n can be assigned to handle keys 7-9. The event producer 102 can determine how to distribute the event messages 104a-n among the nodes 114a-n based on a mapping 112 that correlates the keys to their assigned nodes 114a-n. The event producer 102 can then transmit the event messages 104a-n to the appropriate nodes 114a-n. The event producer 102 can transmit an event message directly to its destination node or indirectly to its destination node. One example of the event producer 102 transmitting an event message 104b indirectly to a destination node 114a can involve the event producer 102 first transmitting the event message 104b to an intermediary node 114b, which in turn can forward the event message to the destination node 114a. It will be appreciated that in other examples, the event broker 106 can alternatively include the mapping 112 for distributing incoming event messages 104a-n among the nodes 114a-n.

In some examples, the mapping 112 can be a database that includes relationships between keys and nodes 114a-n, such that each key is assigned to one (and only one) node. Alternatively, the mapping 112 can include a mathematical algorithm for converting keys to node identifiers. An example of such a mathematical algorithm may be a hash function, such as $F(key, n)=(integer\_hash(key) \% n)+1$. This function computes an integer hash-value from the key and applies a modulo function, plus one, on the result. The output of the function is a number ranging from 1 to n, which can be used as an identifier for a destination node in the event broker 106. Such a function can be used to randomly assign keys proportionally across the available nodes 114a-n, such that the same key is always assigned to the same node. But in other examples, other mathematical algorithms can be used to map the keys to the nodes 114a-n.

The event broker 106 can receive the event messages 104a-n at the nodes 114a-n, which can perform one or more operations based on the event messages 104a-n. Examples of these operations will now be described with reference to FIG. 2.

Figure 2:
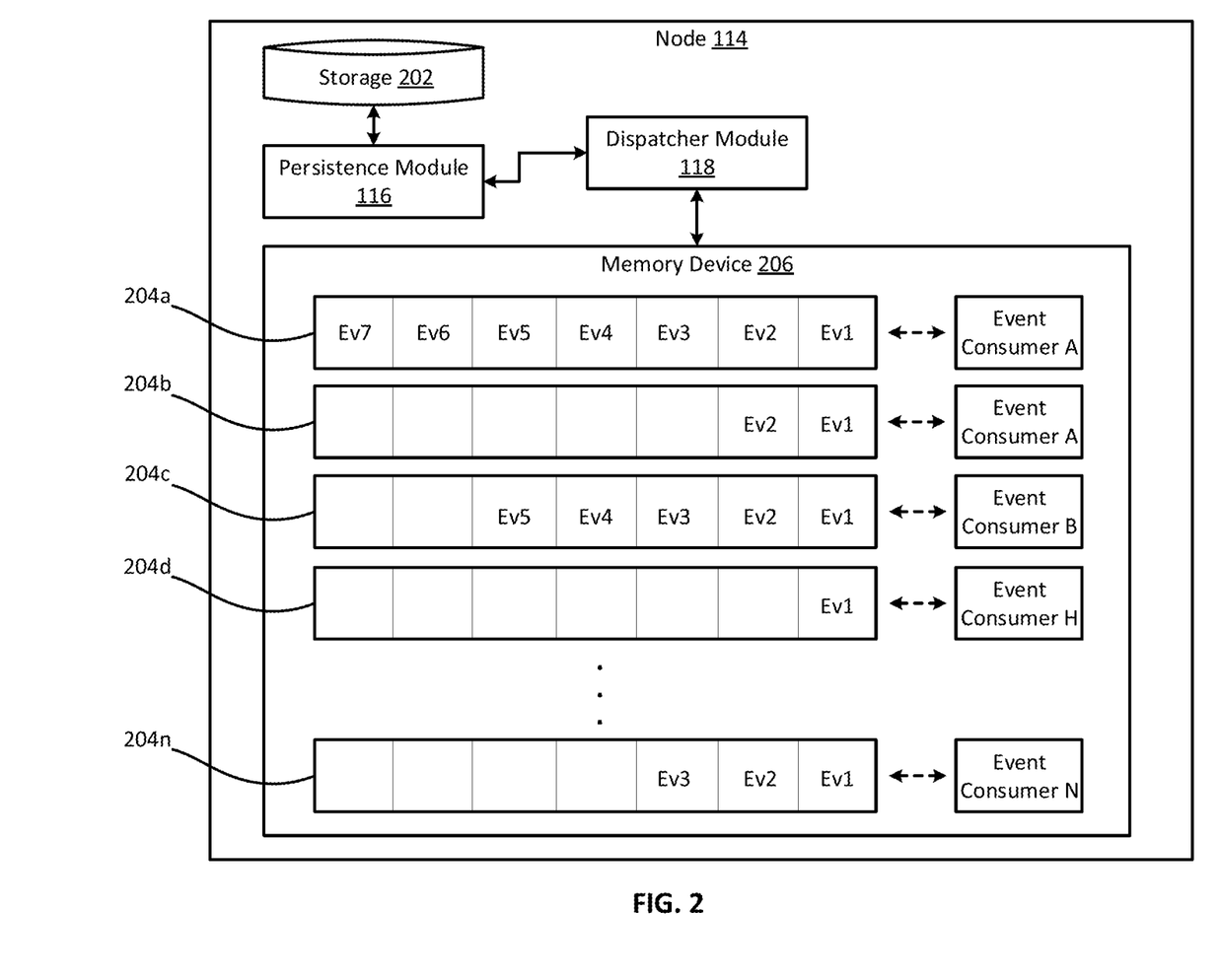
FIG. 2 is a block diagram of an example of a node of an event broker according to some aspects.

As shown in FIG. 2, a node 114 can include a persistence module 116. The persistence module 116 can be an executable software module. The persistence module 116 can receive incoming event messages (e.g., event messages 104a-n of FIG. 1) and store event details included in the event messages in storage 202. Storage 202 can include any kind of volatile or non-volatile storage. For example, storage 202 can include random access memory, cache memory, a hard disk, a solid state drive, or any combination of these. Storing the event details in storage 202 can allow for longer-term persistence of the event details, which may be useful for analyzing how events are handled by the event broker. Before or after storing the event details in storage 202, the persistence module 116 can forward the event messages to a dispatcher module 118.

The dispatcher module 118 can be an executable software module configured to receive event messages and organize them in dispatching queues 204a-n. The dispatcher module 118 may receive the event messages from the persistence module 116 in examples that include the persistence module 116. Alternatively, the dispatcher module 118 may receive the event messages from another source (e.g., an event producer) in examples that lack the persistence module 116.

After receiving an event message, the dispatcher module 118 can determine a key and an event consumer associated with the event message. For example, the event consumers may be subscribed with the event broker to receive certain types of event messages, such as event messages having certain keys. Based on these subscriptions, the dispatcher module 118 can receive an incoming event message, extract a key from the event message, and determine an event consumer for the event message. The dispatcher module 118 can then append the event message to an end of a dispatching queue that is specifically designated for that key and event consumer. The dispatcher module 118 can repeat this process for each event message that is received, thereby maintaining the sequential order of event messages having the same <key, event consumer> pair in the dispatching queues 204a-n.

The dispatching queues 204a-n can be stored in a memory device 206. The memory device 206 may be the same as, or different from, the storage 202 of FIG. 2. The memory device 206 can include any kind of volatile or non-volatile storage. For example, memory device 206 can include random access memory, a cache memory, a hard disk, a solid state drive, or any combination of these. Each dispatching queue 204*a-n* can be specifically and uniquely designated for a <key, event consumer> pair. For example, there may be only one dispatching queue for each <key, event consumer> pair, and that dispatching queue may only consist of event messages for that <key, event consumer> pair. As specific examples, dispatching queue 204*a* may be specifically designated for storing event massages that have a Key of 1 and a destination of Event Consumer A, dispatching queue 204*b* may be specifically designated for storing event massages that have a Key of 2 and a destination of Event Consumer A, dispatching queue 204*c* may be specifically designated for storing event massages that have a Key of 1 and a destination of Event Consumer B, and so on. Each of the dispatching queues 204*a-n* may be a first-in-first-out (FIFO) queue, such as a FIFO buffer, that is configured to maintain a sequential order of event messages based on their receipt time.

In some examples, the memory device 206 may lack a dispatching queue for a particular <key, event consumer> pair. For example, the dispatcher module 118 may receive an event message having a Key of 1 and a destination of Event Consumer N, but a dispatching queue 204*n* for that <key, event consumer> pair may not exist in memory device 206. If the dispatcher module 118 determines that a required dispatching queue 204*n* does yet not exist in memory device 206, the dispatcher module 118 can automatically generate the dispatching queue 204*n* in memory device 206. After generating the dispatching queue 204*n*, the dispatcher module 118 can add the event message to the dispatching queue 204*n*.

As event messages are received by the dispatcher module 118, the dispatcher module 118 can position the event messages into the appropriate dispatching queues in the order in which the event messages were received. In the example shown in FIG. 2, events that are older in time are designated with lower numbers (e.g., Ev1) and events that are newer in time are designated with higher numbers (e.g., Ev7). By ordering the events messages in the dispatching queues 204*a-n* in this way, the sequential order of event messages having the same key and event consumer can be preserved.

The dispatcher module 118 can also transmit (e.g., push) event messages from each dispatching queue to its corresponding event consumer in the order in which the event messages are stored in the dispatching queue. For example, the dispatcher module 118 can transmit event messages Ev1-Ev7 to Event Consumer A in the order in which those event messages are stored in dispatching queue 204*a*. In particular, the dispatcher module 118 can transmit event message Ev1, then event message Ev2, then event message Ev3, the event message Ev4, and so on. Sequentially transmitting the event messages in this way can avoid problems typically arising from event messages being delivered out-of-order or concurrently to an event consumer. If a dispatching queue 204*n* becomes completely depleted such that there are no more event messages remaining in the dispatching queue 204*n* (e.g., the dispatching queue is empty), the dispatcher module 118 can remove the dispatching queue 204*n* from the memory device 206. This may help preserve memory space and other computing resources.

In some examples, the dispatcher module 118 may receive an event message that lacks a key, since not all event messages may have a key. If an event message lacks a key, the dispatcher module 118 may forward the event message to the appropriate event consumer, without first queuing the event message in a dispatching queue. In this way, event messages that include keys can be queued and maintained in their sequential order, whereas event message that exclude keys can be automatically forwarded upon receipt. This can be referred to as "partial order management," since the event broker is sensitive to the sequential order of some types of event messages (e.g., event messages with keys) but agnostic to the order of other types of event messages (e.g., event messages that lack keys).

Referring now back to FIG. 1, the nodes 114*a-n* can transmit event messages 104*a-n* to the event consumers 108*a-n* in accordance with the abovementioned process. The event consumers 108*a-n* can respond to the event messages 104*a-n* by performing one or more operations (e.g., functions). The event consumers 108*a-n* can be any suitable type of software that is triggerable in response to the event messages 104*a-n*. One exemplary type of event consumer can be a serverless function, such as a Lambda function in Amazon Web Services. A serverless function can be an ephemeral, self-contained, discrete piece of code (e.g., set of logic or operations) configured to perform a particular task when executed in a serverless computing environment 100 and then become dormant when execution completes. Another exemplary type of event consumer can be a microservice. A microservice can be a self-contained stateless service that is generally designed to perform a specific task. Microservices can communicate with each other through well-defined application programming interfaces (APIs) in order to work together to generate responses to end-user requests. Serverless functions and microservices may be individually "owned" or developed by different developers and deployed independently of each other, which can provide improvements to scalability, robustness, isolation, and development time over conventional monolithic software-applications.

Each of the event consumers 108*a-n* can be an autoscaling pool of instances. That is, each of the event consumers 108*a-n* can include an adjustable number of instances that is automatically scalable by the serverless computing environment 100 in response to one or more conditions. For example, the serverless computing environment 100 can dynamically scale up the number of instances of event consumer 108*a* in response to an increased loading condition (e.g., an increased number of events) or can dynamically scale down the number of instances of event consumer 108*a* in response to a decreased loading condition. But this dynamic scaling may not impede proper delivery of event messages in some examples, since the order in which the event broker 106 transmits event messages to an event consumer 108*a* is independent of the number of instances of the event consumer 108*a*.

It will be appreciated that the examples shown in FIGS. 1-2 are intended to be illustrative and non-limiting. Other examples may include more components, fewer components, different components, or a different arrangement of the components shown in FIGS. 1-2. For instance, some examples may lack the persistence module 116 or may combine the functionality of the persistence module 116 and the dispatcher module 118 together into a single module. Additionally, the serverless computing environment 100 can include any number and combination of event producers 102, nodes 114*a-n*, event consumers 108*a-n*, and dispatching queues 204*a-n*.

Figure 3:
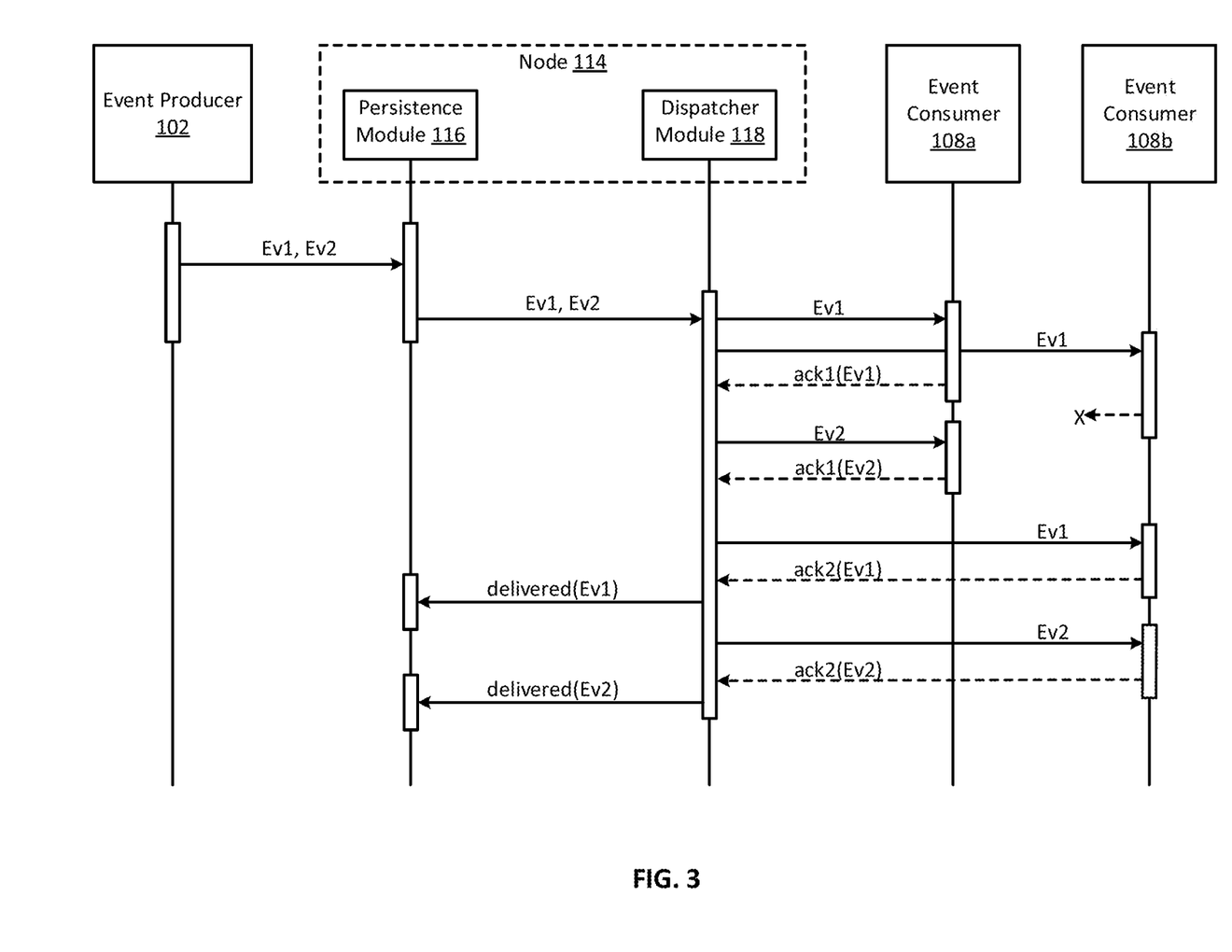
FIG. 3 is a sequence diagram of an example of a process for managing event delivery in a serverless computing environment according to some aspects of the present disclosure.

FIG. 3 a sequence diagram of an example of a process for managing event delivery in a serverless computing environment 100 according to some aspects of the present disclosure. The exemplary process involves the event producer 102, event consumers 108a-b, persistence module 116, and dispatcher module 118 described above.

The process can generally begin with the dispatcher module 118 obtaining an oldest event message (oldest in time) from a dispatching queue and attempting to transmit that event message to its corresponding event consumer. If delivery is successful, the event consumer can respond with an acknowledgement message that acknowledges receipt of the event message. If delivery is unsuccessful, the dispatcher module 118 can retry delivering the event message to the event consumer after waiting for a delay period. The dispatcher module 118 can iterate this process, with a variable delay period in some examples, until delivery is successful or until a predefined number of maximum attempts is reached. If the predefined number of maximum attempts is reached, the dispatcher module 118 can discard the event message from the dispatching queue. Once the sending phase is complete (e.g., an acknowledgement is received from the event consumer or the event message is discarded), the dispatcher module 118 can mark the event message as delivered to the event consumer. In some examples, if the event message has been delivered to all intended event consumers, the dispatcher module 118 can notify the persistence module 116. This may allow the persistence module 116 to accurately monitor the number of event messages currently in transit (e.g., the number of "in-flight" event messages) to event consumers. The dispatcher module 118 can then iterate the above process by selecting the next event message in the dispatching queue, until there are no other event messages present in the dispatching queue. If there are no event messages left in the dispatching queue, the dispatching queue can be deleted to free up memory and other computing resources.

A specific example of the above process is shown in FIG. 3. As shown, an event producer 102 can transmit two event messages (Evt1 and Evt2) to the persistence module 116 of node 114. The persistence module 116 may receive the event messages and store them in storage or perform other tasks in relation to the event messages. The persistence module 116 can then forward the event messages to the dispatcher module 118. The dispatcher module 118 can store the event messages in their sequential order in respective dispatching queues. One dispatching queue may correspond to event consumer 108a and the other dispatching queue may correspond to event consumer 108b.

After storing the event messages in the dispatching queues, the dispatcher module 118 can attempt to transmit event message 1 (Evt1) to event consumer 108a. Event consumer 108a can receive event message 1 and respond to the dispatcher module 118 with an acknowledgement. Dispatcher module 118 can also attempt to transmit event message 1 to event consumer 108b. Event consumer 108b may not receive event message 1 and therefore may not respond to the dispatcher module 118 (as indicated in FIG. 3 by the dashed arrow with an X).

Since event message 1 was successfully delivered to the event consumer 108a, the dispatcher module 118 may next transmit event message 2 (Ev2) to the event consumer 108a, which can receive and acknowledge event message 2. And since event message 1 was not successfully delivered to the event consumer 108b, the dispatcher module 118 may try again to transmit event message 1 to the event consumer 108b, which can receive and acknowledge event message 1 this time. It will be appreciated that event consumer 108a has received and acknowledged both event messages in the time taken for event consumer 108b to successfully receive and acknowledge event message 1. After both event consumers 108a-b have received and acknowledged event message 1, the dispatcher module 118 may transmit a delivery message to the persistence module 116 notifying the persistence module 116 that event message 1 has been delivered to all intended event consumers.

The dispatcher module 118 can next transmit event message 2 to the event consumer 108b, which can receive and acknowledge event message 2. Now that both event consumers 108a-b have received and acknowledged event message 2, the dispatcher module 118 may also transmit a delivery message to the persistence module 116 notifying the persistence module 116 that event message 2 has been delivered to all intended event consumers.

Using the techniques described above, the event broker can ensure that (i) event messages with the same key are processed in the sequential order in which they arrived at the event broker, (ii) event messages having the same key are processed sequentially by a single event consumer, (iii) event messages with the same key can be processed in parallel by different event consumers, and (iv) event messages with different keys can be processed in parallel by all event consumers. This is achieved with only a negligible increase in latency and processing time over traditional serverless computing environments, since storing and retrieving event messages in dispatching queues requires little additional computational effort.

It will be appreciated that the abovementioned process is intended to be illustrative and non-limiting. Other examples include more steps, fewer steps, different steps, or a different order of the steps than described above.

Figure 4:
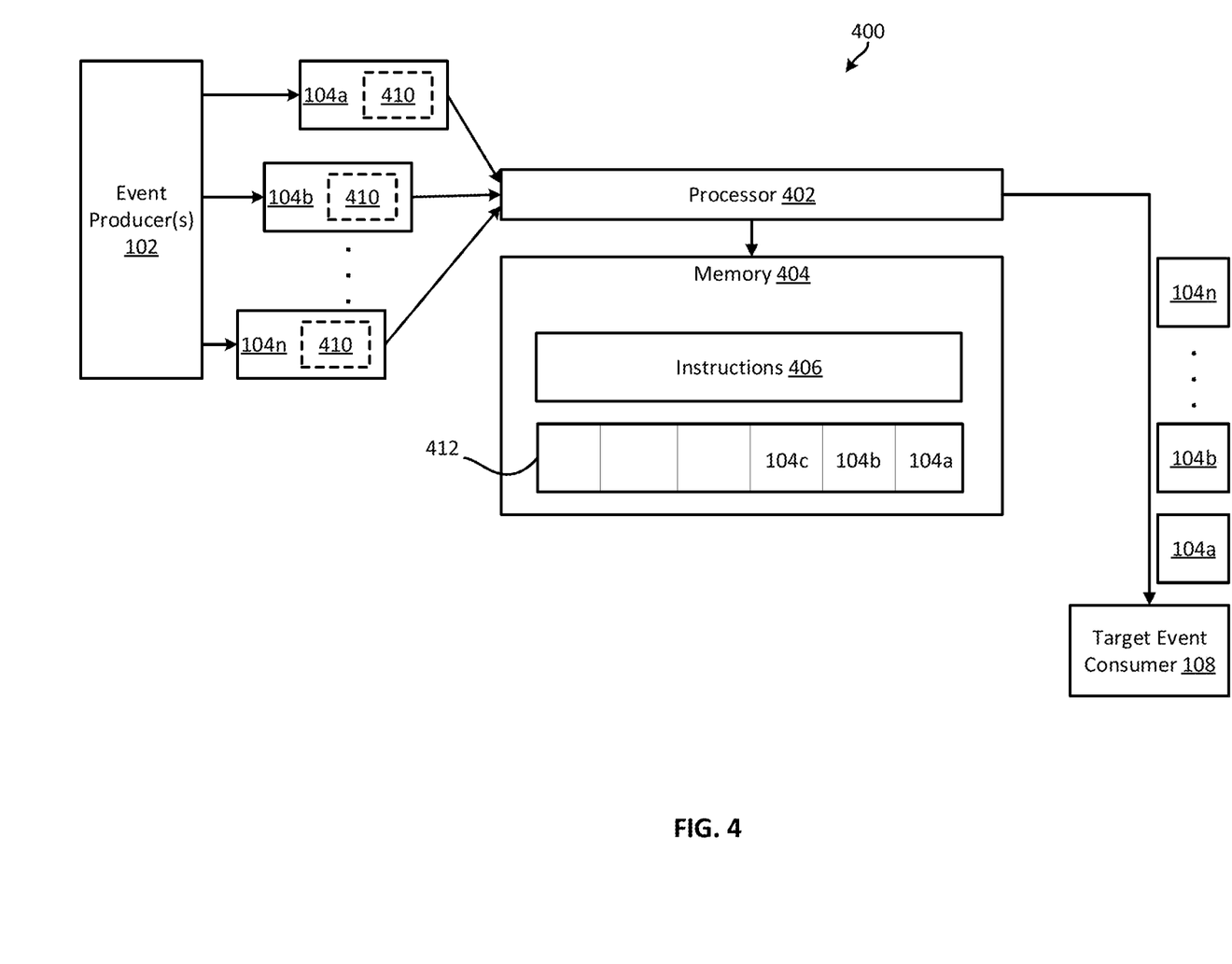
FIG. 4 is a block diagram of another example of a system for managing event delivery in a serverless computing environment according to some aspects of the present disclosure.

FIG. 4 is a block diagram of another example of a system for managing event delivery in a serverless computing environment according to some aspects of the present disclosure. The system 400 includes a processor 402 communicatively coupled with a memory 404. The processor 402 and the memory 404 can be parts of a distributed computing environment, such as the serverless computing environment 100 of FIG. 1.

The processor 402 can include one processor or multiple processors. Non-limiting examples of the processor 402 include a Field-Programmable Gate Array (FPGA), an application-specific integrated circuit (ASIC), a microprocessor, etc. The processor 402 can execute instructions 406 stored in the memory 404 to perform operations. The instructions 406 can include processor-specific instructions generated by a compiler or an interpreter from code written in any suitable computer-programming language, such as C, C++, C #, etc. In some examples, the instructions 406 may configured at least in part to implement an event broker, such as the event broker 106 of FIG. 1.

The memory 404 can include one memory or multiple memories. The memory 404 can be the same as, or different from, the memory device 206 of FIG. 2. Non-limiting examples of the memory 404 can include electrically erasable and programmable read-only memory (EEPROM), flash memory, or any other type of non-volatile memory. At least some of the memory 404 includes a non-transitory computer-readable medium from which the processor 402 can read the instructions 406. The non-transitory computer-readable medium can include electronic, optical, magnetic, or other storage devices capable of providing the processor 402 with computer-readable instructions or other program code. Examples of the non-transitory computer-readable medium can include magnetic disk(s), memory chip(s), ROM, random-access memory (RAM), an ASIC, optical storage, or any other medium from which a computer processor can read the instructions 406.

In some examples, the processor 402 can receive a plurality of event messages 104a-n in a sequential order from one or more event producers 102 in a serverless computing environment, such as the serverless computing environment 100 of FIG. 1. The processor 402 can determine that each event message in the plurality of event messages 104a-n includes a particular key 410 (e.g., the same key) among a plurality of possible keys. The processor 402 can also determine a target event consumer 108 that is to receive the plurality of event messages 104a-n. Based on each event message in the plurality of event messages 104a-n including the particular key 410, the processor 402 can add each event message to a dispatching queue 412 in the sequential order in which the plurality of event messages 104a-n were received. The dispatching queue 412 can be a first-in-first-out queue that is assigned to the particular key 410 and the target event consumer 108. The processor 402 can then provide the plurality of event messages 104a-n in the dispatching queue 412 to the target event consumer 108 in the sequential order in which the plurality of event messages 104a-n are positioned in the dispatching queue 412.

Figure 5:
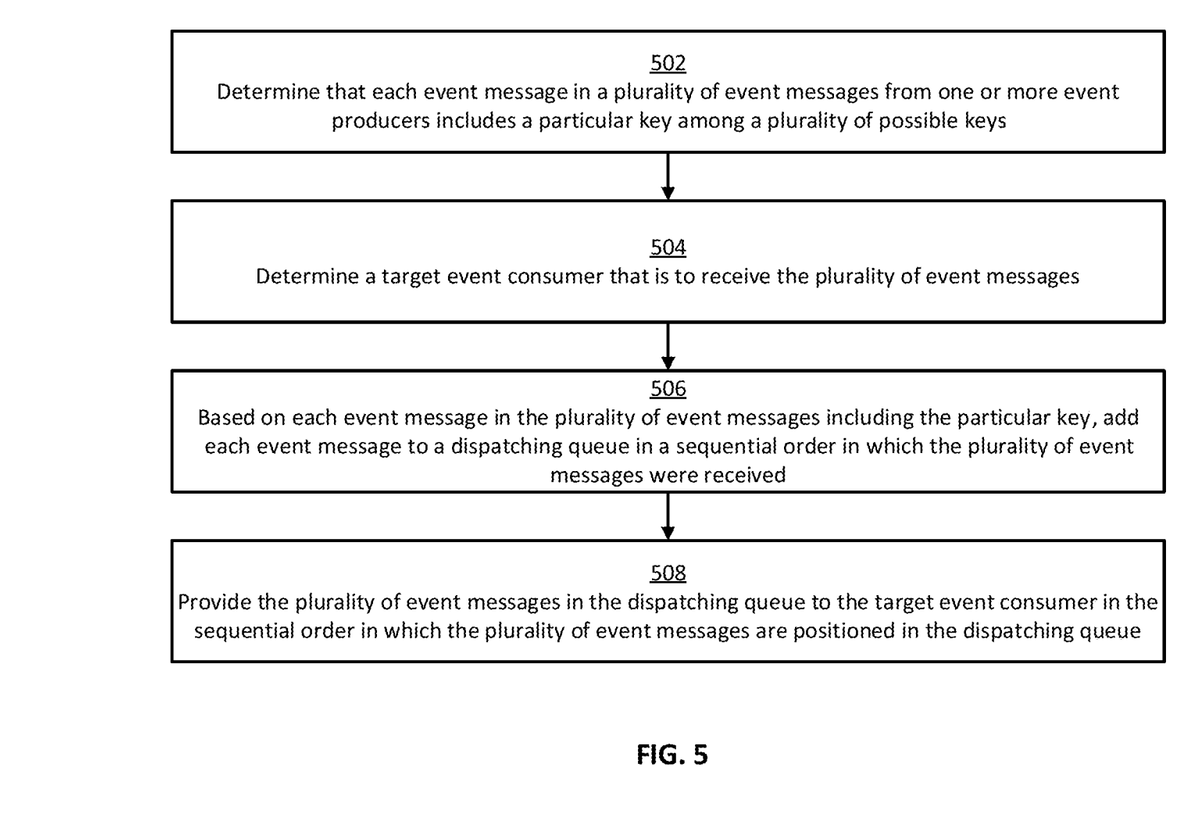
FIG. 5 is a flow chart of an example of a process for managing event delivery in a serverless computing environment according to some aspects of the present disclosure.

In some examples, the processor 402 can implement some or all of the steps shown in FIG. 5. Other examples can include more steps, fewer steps, different steps, or a different order of the steps than is shown in FIG. 5. The steps of FIG. 5 are discussed below with reference to the components discussed above in relation to FIG. 4.

In block 502, the processor 402 determines that each event message in a plurality of event messages 104a-n from one or more event producers 102 includes a particular key 410 (e.g., the same key) among a plurality of possible keys. For example, the processor 402 can extract the particular key 410 from each event message in the plurality of event messages 104a-n.

In block 504, the processor 402 determines a target event consumer 108 that is to receive the plurality of event messages 104a-n. In some examples, the processor 402 can determine the target event consumer 108 based on stored information about event consumers, such as subscription information about which event consumers have subscribed to receive certain types of event messages. For example, the target event consumer 108 may have subscribed to receive event messages having the particular key. Based on this subscription information, the processor 402 can determine that the target event consumer 108 is to receive the plurality of event messages 104a-n.

In block 506, the processor 402 adds each event message to a dispatching queue 412 in a sequential order in which the plurality of event messages 104a-n were received (e.g., by the processor 402), based on each event message in the plurality of event messages 104a-n including the particular key 410. The dispatching queue 412 can be a first-in-first-out queue that is assigned to the particular key 410 and/or the target event consumer 108.

In block 508, the processor 402 provides the plurality of event messages 104a-n in the dispatching queue 412 to the target event consumer 108 in the sequential order in which the plurality of event messages 104a-n are positioned in the dispatching queue 412. For example, the processor can push the plurality of event messages 104a-n in the dispatching queue 412 to the target event consumer 108.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any examples described herein can be combined with any other examples to yield further examples.

The invention claimed is:

1. A system comprising:
a processor; and
a memory including instructions for an event broker, the event broker being executable by the processor for causing the processor to:
determine that each event message in a plurality of event messages from one or more event producers includes a particular key among a plurality of possible keys;
determine a target event consumer that is to receive the plurality of event messages;
select a dispatching queue from among a plurality of dispatching queues based on the determined target event consumer and the particular key, wherein the plurality of dispatching queues are assigned to the target event consumer and different keys, and wherein the selected dispatching queue is a first-in-first-out queue that is assigned to the particular key and the target event consumer;
based on each event message in the plurality of event messages including the particular key, add each event message to the selected dispatching queue in a sequential order in which the plurality of event messages were received by the event broker; and
subsequent to adding each event message to the selected dispatching queue, provide the plurality of event messages in the dispatching queue to the target event consumer in the sequential order in which the plurality of event messages are positioned in the dispatching queue;
wherein the one or more event producers are configured to:
access a predefined mapping between a plurality of nodes of the event broker and a plurality of keys, the plurality of nodes being different from target event consumers; and
distribute the plurality of event messages to a particular node among the plurality of nodes based on the predefined mapping.

2. The system of claim 1, wherein the dispatching queue is configured to only include event messages that are designated for the target event consumer and that have the particular key.

3. The system of claim 1, wherein the one or more event producers and the target event consumer are included in a serverless computing environment, and wherein the serverless computing environment includes an adjustable number of instances of the target event consumer, the adjustable number of instances being automatically scalable by the serverless computing environment in response to one or more conditions.

4. The system of claim 1, wherein the target event consumer includes a serverless function or a microservice.

5. The system of claim 1, wherein the event broker is formed from the plurality of nodes, each node in the plurality of nodes being assigned a respective set of keys that does not overlap with other sets of keys assigned to the other nodes in the plurality of nodes, and each node in the plurality of nodes being configured for providing a respective set of event messages associated with the respective set of keys to one or more target event consumers for balancing a load on the event broker among the plurality of nodes.

6. The system of claim 1, wherein the predefined mapping includes a hashing function configured to convert the keys into hashed values corresponding to the plurality of nodes.

7. The system of claim 1, wherein the memory further includes instructions that are executable by the processor for causing the processor to:
prior to adding the plurality of event messages to the dispatching queue, determine that the dispatching queue does not exist in a memory device accessible to the event broker and responsively generate the dispatching queue in the memory device; and
subsequent to transmitting the plurality of event messages to the target event consumer, determine that the dispatching queue is empty and responsively remove the dispatching queue from the memory device.

8. The system of claim 1, wherein the one or more event producers include the predefined mapping.

9. A method comprising:
determining, by a processor, that each event message in a plurality of event messages from one or more event producers includes a particular key among a plurality of possible keys;
determining, by the processor, a target event consumer that is to receive the plurality of event messages;
selecting, by the processor, a dispatching queue from among a plurality of dispatching queues based on the determined target event consumer and the particular key, wherein the plurality of dispatching queues are assigned to the target event consumer and different keys, and wherein the selected dispatching queue is a first-in-first-out queue that is assigned to the particular key and the target event consumer;
based on selecting the dispatching queue, adding, by the processor, each event message to the selected dispatching queue in a sequential order in which the plurality of event messages were received by the processor; and
subsequent to adding each event message to the dispatching queue, providing, by the processor, the plurality of event messages in the dispatching queue to the target event consumer in the sequential order in which the plurality of event messages are positioned in the dispatching queue;
wherein the one or more event producers are configured to:
access a predefined mapping between a plurality of nodes of an event broker and a plurality of keys, the plurality of nodes being different from target event consumers; and
distribute the plurality of event messages to a particular node among the plurality of nodes based on the predefined mapping.

10. The method of claim 9, wherein the dispatching queue is only assigned to the target event consumer and the particular key.

11. The method of claim 9, further comprising automatically scaling an adjustable number of instances of the target event consumer in a serverless computing environment in response to one or more conditions.

12. The method of claim 9, wherein the target event consumer includes a serverless function or a microservice.

13. The method of claim 9, wherein the predefined mapping includes a hashing function configured to convert keys into hashed values corresponding to the plurality of nodes.

14. The method of claim 9, further comprising:
prior to adding the plurality of event messages to the dispatching queue, determining that the dispatching queue does not exist in a memory device and responsively generating the dispatching queue in the memory device; and
subsequent to transmitting the plurality of event messages to the target event consumer, determining that the dispatching queue is empty and responsively removing the dispatching queue from the memory device.

15. The method of claim 9, wherein the one or more event producers include the predefined mapping.

16. A non-transitory computer-readable medium comprising program code that is executable by a processor for causing the processor to:
determine that each event message in a plurality of event messages from one or more event producers includes a particular key among a plurality of possible keys;
determine a target event consumer that is to receive the plurality of event messages;
based on each event message in the plurality of event messages including the particular key, add each event message to a dispatching queue in a sequential order in which the plurality of event messages were received by the processor, wherein the dispatching queue is a first-in-first-out queue that is assigned to the particular key and the target event consumer; and
provide the plurality of event messages in the dispatching queue to the target event consumer in the sequential order in which the plurality of event messages are positioned in the dispatching queue;
wherein the one or more event producers are configured to:
access a predefined mapping between a plurality of nodes of an event broker and a plurality of keys, the plurality of nodes being different from target event consumers; and
distribute the plurality of event messages to a particular node among the plurality of nodes based on the predefined mapping.

17. The non-transitory computer-readable medium of claim 16, wherein the target event consumer includes a serverless function or a microservice.

18. The non-transitory computer-readable medium of claim 16, wherein the predefined mapping includes a hashing function configured to convert the keys into hashed values corresponding to the plurality of nodes.

19. The non-transitory computer-readable medium of claim 16, further comprising program code that is executable by the processor for causing the processor to:
prior to adding the plurality of event messages to the dispatching queue, determine that the dispatching queue does not exist in a memory device and responsively generate the dispatching queue in the memory device; and
subsequent to transmitting the plurality of event messages to the target event consumer, determine that the dispatching queue is empty and responsively remove the dispatching queue from the memory device.

20. The non-transitory computer-readable medium of claim 16, further comprising program code that is executable by the processor for causing the processor to select the dispatching queue based on the target event consumer prior to adding each event message to the dispatching queue.

* * * * *